(12) United States Patent
Ochi et al.

(10) Patent No.: US 9,021,208 B2
(45) Date of Patent: Apr. 28, 2015

(54) INFORMATION PROCESSING DEVICE, MEMORY MANAGEMENT METHOD, AND COMPUTER-READABLE RECORDING MEDIUM

(71) Applicant: Fujitsu Limited, Kawasaki-shi (JP)

(72) Inventors: Akira Ochi, Numazu (JP); Yasuo Koike, Numazu (JP); Toshiyuki Maeda, Suntou (JP); Tomonori Furuta, Nagoya (JP); Fumiaki Itou, Kasugai (JP); Tadahiro Miyaji, Nagoya (JP); Kazuhisa Fujita, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 254 days.

(21) Appl. No.: 13/750,196

(22) Filed: Jan. 25, 2013

(65) Prior Publication Data

US 2013/0198460 A1 Aug. 1, 2013

(30) Foreign Application Priority Data

Jan. 27, 2012 (JP) ................. 2012-015694

(51) Int. Cl.
*G06F 12/00* (2006.01)
*G06F 12/08* (2006.01)
*G06F 12/12* (2006.01)

(52) U.S. Cl.
CPC ........ *G06F 12/0891* (2013.01); *G06F 12/0871* (2013.01); *G06F 12/121* (2013.01); *G06F 12/127* (2013.01); *G06F 2212/311* (2013.01); *G06F 2212/461* (2013.01); *G06F 2212/463* (2013.01); *G06F 2212/163* (2013.01)

(58) Field of Classification Search
None
See application file for complete search history.

(56) References Cited

U.S. PATENT DOCUMENTS

| 6,154,813 | A | * | 11/2000 | Martin et al. ................. 711/133 |
| 6,256,747 | B1 | | 7/2001 | Inohara et al. |
| 7,181,574 | B1 | | 2/2007 | Lele |
| 8,171,219 | B2 | | 5/2012 | Trika et al. |

FOREIGN PATENT DOCUMENTS

| JP | 07-182220 | 7/1995 |
| JP | 11-096102 | 4/1999 |

OTHER PUBLICATIONS

Extended European Search Report dated Jul. 10, 2013 for corresponding European Application No. 13152332.6.

* cited by examiner

*Primary Examiner* — Matthew Bradley
*Assistant Examiner* — Alan Otto
(74) *Attorney, Agent, or Firm* — Fujitsu Patent Center

(57) ABSTRACT

An information processing device includes a memory and a processor coupled to the memory, wherein the processor executes a process comprising selecting data included in a same file as deletion target data from the memory when deleting the data cached in the memory at the caching from the memory and deleting the deletion target data and the data selected at the selecting, from the memory.

8 Claims, 11 Drawing Sheets

DEFINITION INFORMATION
DELETION RATE INITIAL VALUE Rt: 0.02 (2%)    MINIMUM DELETION RATE Rtmin: 0.001 (0.1%)
VIRTUAL STORAGE AREA THRESHOLD Ft: 100 MEGABYTES
LOSS ACCELERATION CAUTION VALUE $\alpha t1$: 0.05 (5%)
LOSS ACCELERATION SAFETY VALUE $\alpha t2$: -0.1 (-10%)

| inode | FILE NAME | IP ADDRESS | REMAINING CAPACITY OF VIRTUAL STORAGE AREA OF SERVER |
|---|---|---|---|
| 0x12345678 | /data/file1 | 10.10.10.10 | 1000 M |
| 0x12345bbb | /data/file1 | 10.10.10.100 | 900 M |
| 0x12345bbc | /A-FILE | 10.200.10.222 | 100 M |
| 0x12345680 | /data/file1 | 10.10.111.222 | 100 M |
| 0x1234562a | /DATA33 | 10.10.111.222 | 100 M |

INFORMATION PROCESSING DEVICE, MEMORY MANAGEMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2012-015694, filed on Jan. 27, 2012, the entire contents of which are incorporated herein by reference.

FIELD

The embodiments discussed herein are related to an information processing device, a memory management method and a memory management program.

BACKGROUND

In the related art, as a technique of speeding up access to data, a cache is known. For example, in an operating system (OS) of a computer, by storing part of data stored in a storage device such as a disk of slow access speed in a storage device such as a memory of fast access speed, access to the data is speeded up.

Generally, a storage device such as a memory of fast access speed has a small capacity and is used for other intended purposes than a cache, such as a program execution area and an OS management area. Therefore, the OS manages a memory area so as to allow leeway in some degree. For example, when an available memory remaining amount is below a predetermined value, the OS performs cache out processing to delete data stored in a cache area from the memory and restores the memory remaining amount.

As this cache out processing, LRU (Least Recently Used) and MRU (Most Recently Used) are known. The LRU is a method of deleting data that has not been used for a long time and the MRU is a method of deleting data that was recently used. In addition to these, there is a well-known method of giving priority to cached data in order of data to be remained by the user and deleing data in order from data of the lowest priority.

Also, in addition to control by the above OS, for example, there is a well-known method of setting an intermediate layer to perform cache control by an application between an application layer and cache control by an OS, and managing a cache by the application.

Patent Literature 1 Japanese Laid-open Patent Publication No. 7-182220

Patent Literature 2 Japanese Laid-open Patent Publication No. 11-96102

However, in the related art, since a fragmentation occurs in a cache area and the application execution speed is reduced, there is a problem that the processing performance degrades.

For example, in the related art, when data is deleted from a cache area, it is deleted in 4-kilobyte page units. Therefore, when one file is equal to or greater than 4 kilobytes, there is a case where the whole file does not remain on the cache area and only part of the file remains on the cache area. That is, fragmentation of the cache area occurs. In this state, when a given file is accessed, it is not possible to solve it in the cache area, and a disk is accessed to read partial data that is not present in the cache area. As a result, low-speed disk access occurs, the application execution speed becomes slow and degradation of the processing performance is caused.

Also, in a method of adding a new layer to a layered system in normal cache control, a processing layer is increased by one and therefore degradation of the speed to read data from a cache area is caused. For example, when an application reads data from a cache, cache control by a normal OS is requested to read the data via cache control by the application. After that, the date read by the cache control by the normal OS is acquired via the cache control by the application. Thus, since processing increases by an increase of a layer, the application execution speed becomes slow and, as a result, the processing performance degrades.

SUMMARY

According to an aspect of the embodiments, an information processing device includes a memory; and a processor coupled to the memory, wherein the processor executes a process including: caching data read from a storage or data written into the storage, in the memory; selecting data included in a same file as deletion target data from the memory when deleting the data cached in the memory at the caching from the memory; and deleting the deletion target data and the data selected at the selecting, from the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings.

Also, the invention is not limited to these embodiments.

[a] First Embodiment

Whole Configuration

Figure 1:
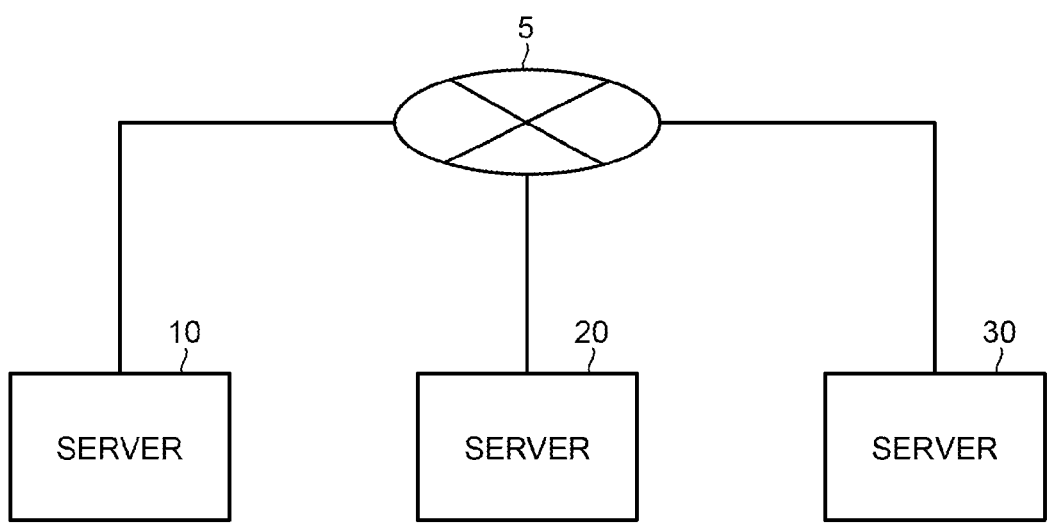
FIG. 1 is a diagram illustrating a whole configuration example of an information processing system according to a first embodiment.

FIG. 1 is a diagram illustrating a whole configuration example of an information processing system according to a first embodiment. As illustrated in FIG. 1, in the information processing system, a server 10, a server 20 and a server 30 are connected to each other via a network 5. Here, although an example is illustrated in which it is configured with three servers, it is not limited to this and the number may be at least one. Also, each server is a Web server, application server, and so on, and does not limit processing content.

Also, in the information processing system illustrated in FIG. 1, each server may perform various kinds of processing individually or each server may perform processing in cooperation. As a cooperation example, for example, there is a distributed processing system using Hadoop or HDFS (Hadoop Distributed File System).

Each server in such an information processing system stores data read from a storage unit or data written in the storage unit, in a page cache area (which may be hereinafter referred to as "page cache") managed by an OS kernel. Subsequently, when deleting the data stored in the page cache area managed by the OS kernel, each server selects data included in the same file as the deletion target data, from the page cache area managed by the OS kernel. After that, each server deletes the deletion target data and the selected data. Here, the page cache area managed by the OS kernel will be simply referred to as "page cache" below. Also, storage in the page cache will be simply referred to as "cache."

For example, when deleting data that is recently referred to from a page cache, each server specifies an mode number held by the page cache. Subsequently, each server specifies a page cache having the same inode number as the specified inode number, from the page cache. That is, each server specifies data, which is part of a file including the deletion target data, among data stored in the page cache. After that, each server deletes the specified data and the deletion target data from the page cache.

Thus, when deleting data on a page cache by cache out, each server can delete data on the page cache in page units and file units. As a result, it is possible to suppress page cache fragmentation, suppress degradation of the application processing speed and suppress degradation of the processing performance.

Server Configuration

Figure 2:
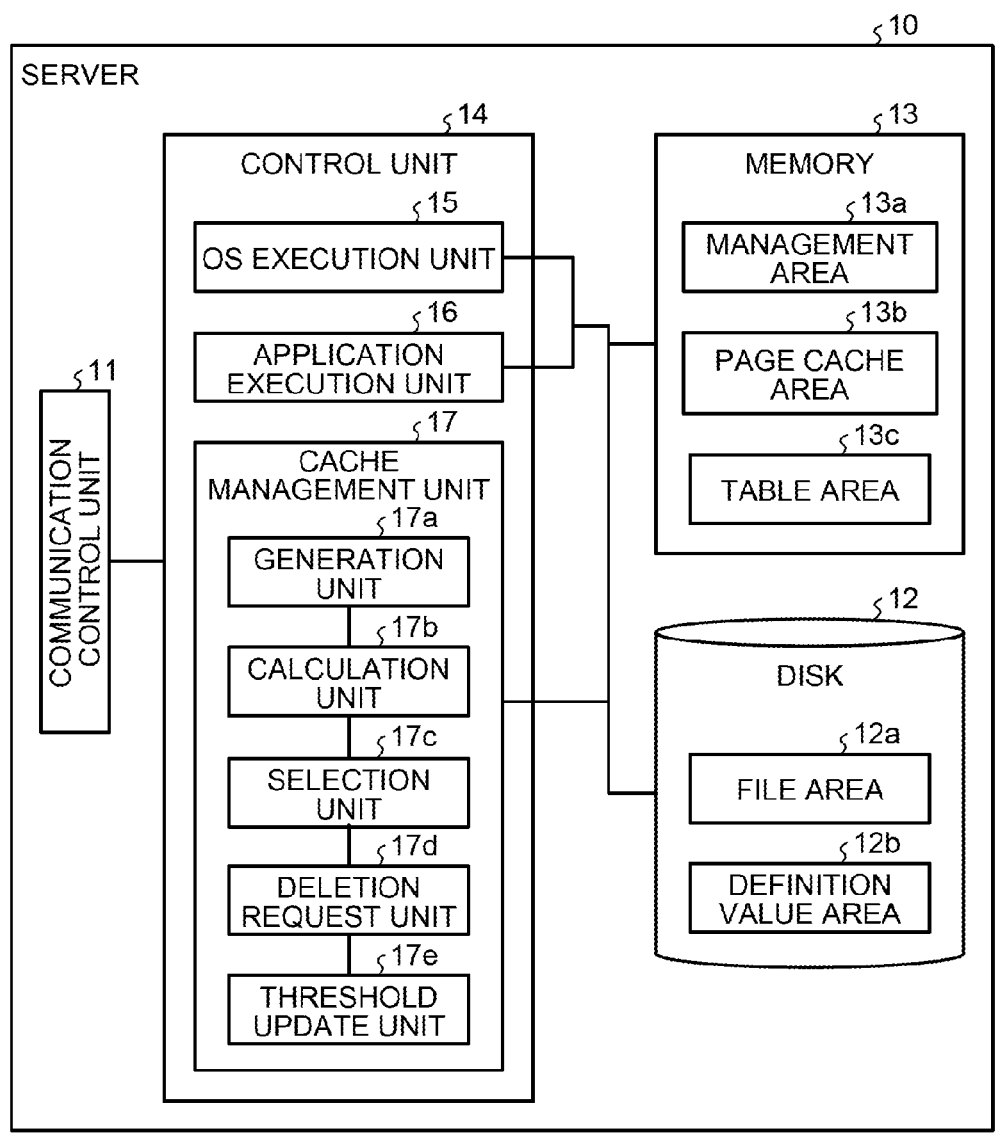
FIG. 2 is a function block diagram illustrating a configuration of a server according to the first embodiment.

Next, the servers illustrated in FIG. 1 will be explained. The servers illustrated in FIG. 1 have the same configuration and therefore the server 10 will be explained as an example. FIG. 2 is a block diagram illustrating a configuration of the server according to the first embodiment. As illustrated in FIG. 2, the server 10 includes a communication control unit 11, a disk 12, a memory 13 and a control unit 14. Also, the processing units illustrated in FIG. 2 are just examples and may include other processing units such as an input unit like a mouse and a display unit like a display.

The communication control unit 11 is a processing unit to control communication with other servers and denotes, for example, a network interface card. For example, the communication control unit 11 outputs various requests or data received from other servers, to the control unit 14. Also, the communication control unit 11 transmits a processing result or data output from the control unit 14, to a destination server.

The disk 12 is a storage device to store data or the like, and denotes a hard disk drive, for example. This disk 12 includes a file area 12a and a definition value area 12b. The file area 12a is an area to store data such as a file used by an application executed by, for example, an application execution unit 16 of the control unit 14.

Figures 3, 4:
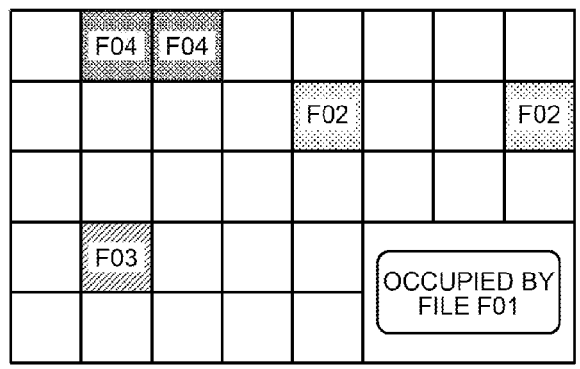
FIG. 3 is a diagram illustrating an example of information stored in a definition value area of a disk.
FIG. 4 is a diagram illustrating an example of a page cache area of a memory.

The definition value area 12b is an area to store various definition values used when a cache management unit 17 decides whether to delete a file from the memory 13. FIG. 3 is a diagram illustrating an example of information stored in a definition value area of a disk. As illustrated in FIG. 3, the definition value area 12b stores "deletion rate initial value Rt," "minimum deletion rate Rtmin," "virtual storage area threshold Ft," "loss acceleration $\alpha t1$" and "loss acceleration $\alpha t2$."

The "deletion rate initial value Rt" is an initial value of a threshold used when deciding whether to delete a cached page from the memory 13, and is designated to, for example, 0.02 (2%). This "deletion rate initial value Rt" is updated by a threshold update unit 17e. The "minimum deletion rate Rtmin" is a minimum value of the threshold and is set by, for example, a manager. The "virtual storage area threshold Ft" is a threshold used when deciding whether there is leeway in an available capacity of a virtual memory that is virtually assigned to a physical area of the memory 13, and is set by, for example, a manager. The "loss acceleration $\alpha t1$" and the "loss acceleration $\alpha t2$" are thresholds used when deciding the page cache release speed, and are set by, for example, a manager. When the release rate (R) calculated by the cache management unit 17 is between $\alpha t1$ and $\alpha t2$, it is decided that the page cache release speed is a safety value.

Returning to FIG. 2, the memory 13 is a storage device to store, for example, a program executed by the control unit 14, and caches data read from the disk 12 or data written in the disk 12. This memory 13 includes a management area 13a, a page cache area 13b and a table area 13c. The management area 13a is an area used for other intended purposes than a cache, such as an OS management area.

The page cache area 13b is an area to store the data read from the disk 12 or written in the disk 12, that is, a cache. FIG. 4 is a diagram illustrating an example of a page cache area of a memory. As illustrated in FIG. 4, the page cache area 13b is a resource managed by an OS kernel. In the case of FIG. 4, one page (one mass) is 4 kilobytes and only one file data is stored in one page. File data of a size over 4 kilobytes occupies a plurality of pages. Also, page-out processing is performed in page units.

In the case of FIG. 4, a state is illustrated in which data of a file 04 (F04) is stored in continuous pages and data of a file 01 (F01) occupies six pages. Also, it illustrates that data of a file 02 (F02) is stored in discontinuous pages.

Figure 5:
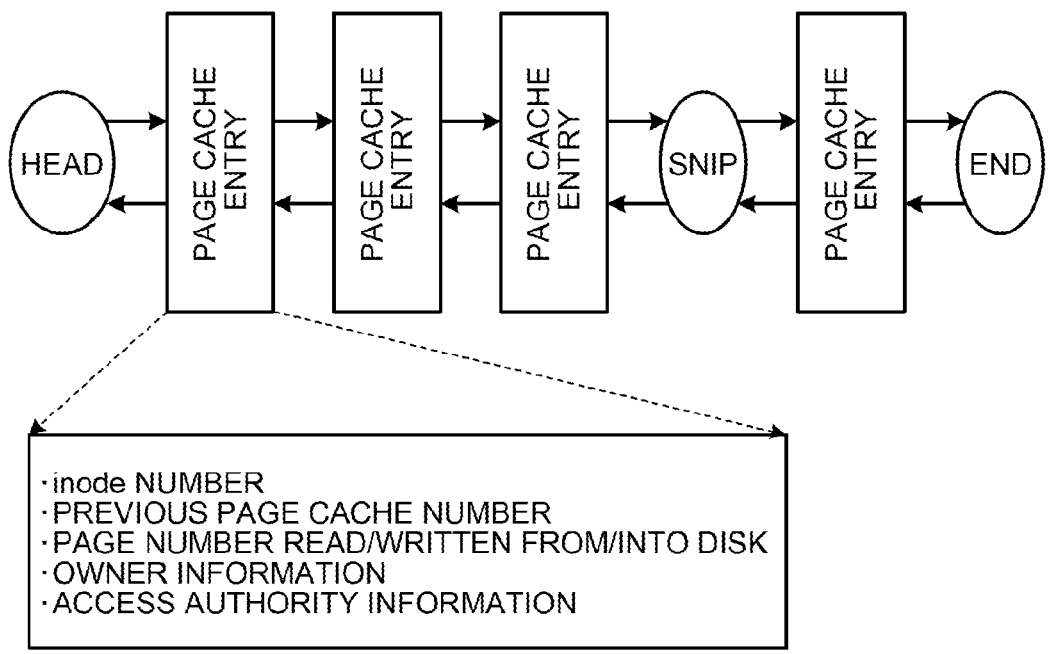
FIG. 5 is a diagram illustrating an example of cache management information stored in a table area of a memory.

The table area 13c is an area to store management information used by the cache management unit 17. FIG. 5 is a diagram illustrating an example of cache management information stored in the table area of the memory. As illustrated in FIG. 5, the cache management information is information formed with a linked list of file-unit cache entries cached in the memory 13. In the head, a file that is least referred to on the memory 13 is positioned. That is, when it is closer to the head, it is likely to be discarded by the OS, and, when it is closer to the end, it is less likely to be discarded by the OS.

Each page cache entry has an "inode number," "previous page cache number," "page number read/written from/into disk" "owner information" and "access authority information." The "inode number" is an identifier to identify a file or management information related to a file, for example. The "previous page cache number" is the total page number of a file cached by the memory 13 a predetermined time before, and is the total page number of the page cached at the time of previously deciding by the cache management unit 17 whether to delete it from the memory.

The "page number read/written from/into disk" is a sum value of the file page number read from the disk 12 and the file page number written into the disk 12. This "page number read/written from/into disk" is updated by a generation unit 17a. The "owner information" is the user name owning a file. The "access authority information" is information to indicate the access authority assigned to the file. The "inode number," the "owner information" and the "access authority information" can be acquired from the OS or the page cache.

The control unit 14 is a processing unit to control the whole processing of the server 10, like an electronic circuit such as a CPU (Central Processing Unit). This control unit 14 includes an OS execution unit 15, the application execution unit 16 and the cache management unit 17.

The OS execution unit 15 is a processing unit to execute an OS. The OS executed by this OS execution unit 15 adds a page cache to the memory 13 and deletes a page cache from the memory 13. For example, the OS execution unit 15 deletes each page cache having an inode number received from the cache management unit 17 (described later), from the page cache area of the memory 13.

The application execution unit 16 is a processing unit to execute an application. The application executed by this application execution unit 16 decides whether used data is cached, with reference to the page cache area 13b of the memory 13. Subsequently, in the case of a cache hit, the application reads the corresponding data, that is, page, from the page cache area 13b. Also, in the case of a cache miss, the application reads the corresponding data from the file area 12a of the disk 12. Subsequently, the application stores the data read from the file area 12a of the disk 12, in the page cache area 13b of the memory 13.

The cache management unit 17 is a processing unit including the generation unit 17a, a calculation unit 17b, a selection unit 17c, a deletion request unit 17d and a threshold update unit 17e, and manages a cached mage using these.

The generation unit 17a is a processing unit to generate cache management information indicating information of data cached in the memory 13 and store it in the table area 13c of the memory 13. For example, the generation unit 17a refers to the page cache area 13b a predetermined time after the startup of the server 10, and specifies cached files from an inode number included in a page cache. Subsequently, the generation unit 17a generates cache management information in which they are linked in order from a file entry that is not recently referred to among the specified files. At this time, the generation unit 17a acquires owner information and access authority information of the files from the page cache or the OS, and stores the generated cache management information in each entry.

Also, the generation unit 17a is a processing unit to update the cache management information. For example, in a case where the reading or writing of data is performed by an application executed by the application execution unit 16, the generation unit 17a specifies a file including the read or written data, from the inode number of the data or the like. Subsequently, the generation unit 17a counts the number of page caches created with respect to the specified file and stores it in the "page number read/written from/into disk" of the cache management information.

The calculation unit 17b is a processing unit to calculate a released page cache ratio "R" indicating a ratio of the page cache released from the memory within a predetermined time in the page-cached file. For example, the calculation unit 17b calculates the released page cache ratio "R" at predetermined intervals from the head entry of the cache management information.

To be more specific, the calculation unit 17b acquires a total number "Pc" of currently-cached page caches from the OS, using the inode number of the head entry of the cache management information. Subsequently, the calculation unit 17b acquires a previous page cache number "Pp" and a page number "Δ" read/written from/into a disk, from a target entry. After that, the calculation unit 17b calculates the released page cache ratio "R"="1−(Pc/Pp+Δ)" and outputs the result to the selection unit 17c.

Here, the calculation equation of the released page cache ratio "R" calculated in the calculation unit 17b will be explained. The above equation to calculate the released page cache ratio "R" sets the denominator by adding the previously checked page cache number and the page cache number newly created by subsequent access. In this equation, in a case where a page cache release is implemented by the OS, the current page cache number (numerator) is smaller than the denominator. Also, in this equation, in a case where the release is often performed by the OS, the numerator is small and, as a result, the released page cache ratio "R" is closer to 1. By contrast, in a case where the page cache release is not performed by the OS, the numerator is equal to the denominator and the released page cache ratio "R" is 0.

The selection unit 17c is a processing unit to select data included in a file corresponding to a deletion target entry from the memory 13, in a case where the ratio calculated by the calculation unit 17b is over the released page cache ratio "R." At this time, in a case where "R" is over the threshold and an available capacity "F" of the virtual memory area virtually assigned to the physical area of the memory 13 is below a predetermined value, the selection unit 17c can select data included in the corresponding file from the memory 13.

For example, when the released page cache ratio "R" is calculated by the calculation unit 17b, the selection unit 17c acquires the deletion rate initial value "Rt," the minimum deletion rate "Rtmin" and the "virtual storage area threshold Ft" from the definition value area 12b. Also, the selection unit 17c acquires the available capacity "Ft" of the virtual memory area from the OS. Subsequently, the selection unit 17c decides whether the released page cache ratio "R" is over the deletion rate initial value "Rt" and the available capacity "F" of the virtual memory area is below the virtual storage area threshold "Ft." After that, in a case where the above conditions are satisfied, the selection unit 17c acquires the inode number from the target entry of the cache management information and outputs it to the deletion request unit 17d.

The deletion request unit 17d is a processing unit to request the OS to delete the data selected by the selection unit 17c. For example, the deletion request unit 17d outputs, to an OS executed by the OS execution unit 15, a request to delete an inode number reported from the selection unit 17c and a page cache having the inode number.

After that, the OS deletes the page cache having the received inode number from the memory 13. Subsequently, the generation unit 17a updates the "previous page cache number" of an entry corresponding to the inode in the cache management information to "0." Further, the generation unit 17a updates the "page number read/written from/into disk" of the entry to "0." Here, in a case where a page cache of a file corresponding to the entry is not deleted, the generation unit 17a sets the currently acquired page cache number "Pc" as the "previous page cache number."

The threshold update unit 17e is a processing unit to compare the currently-calculated released page cache ratio "R"

and the previously-calculated released page cache ratio "Rp" and update the deletion rate initial value "Rt" so as to adequately perform a page cache release. Also, the previously-calculated released page cache ratio "Rp" is stored in the memory 13 or the like every calculation, regardless of entries or files.

For example, in a case where a difference "α" between the released page cache ratio "R" calculated by the calculation unit 17b and the released page cache ratio "Rp" a predetermined time before, is greater than a loss acceleration caution value "αt1," the threshold update unit 17e changes the deletion rate initial value "Rt" to a smaller value. Also, in a case where the difference "α" between the released page cache ratio "R" calculated by the calculation unit 17b and the released page cache ratio "Rp" a predetermined time before, is less than a loss acceleration safety value "αt2," the threshold update unit 17e changes the deletion rate initial value "Rt" to a larger value. At this time, the threshold update unit 17e changes the new deletion rate initial value "Rt" so as not to be below the minimum deletion rate "Rtmin."

That is, the threshold update unit 17e decides whether the released page cache ratio is on an upward trend, and changes a threshold in a case where the upward trend is large. For example, in a case where "α" is greater than "αt1," the threshold update unit 17e decides that the page cache release speed is not sufficient, and changes "Rt" to a smaller value. By this means, there is a high possibility that the selection unit 17c decides a page cache deletion, and the page cache release speed increases and the remaining amount of the virtual storage area of the whole device has leeway.

Also, in a case where "α" is less than "αt2," the threshold update unit 17e decides that the page cache release speed is sufficient, and updates "Rt" to a larger value. By this means, there is a small possibility that the selection unit 17c decides a page cache deletion, and the page cache release speed decreases and it is possible to suppress that a page cache release often occurs.

Flow of Processing

Figure 6:
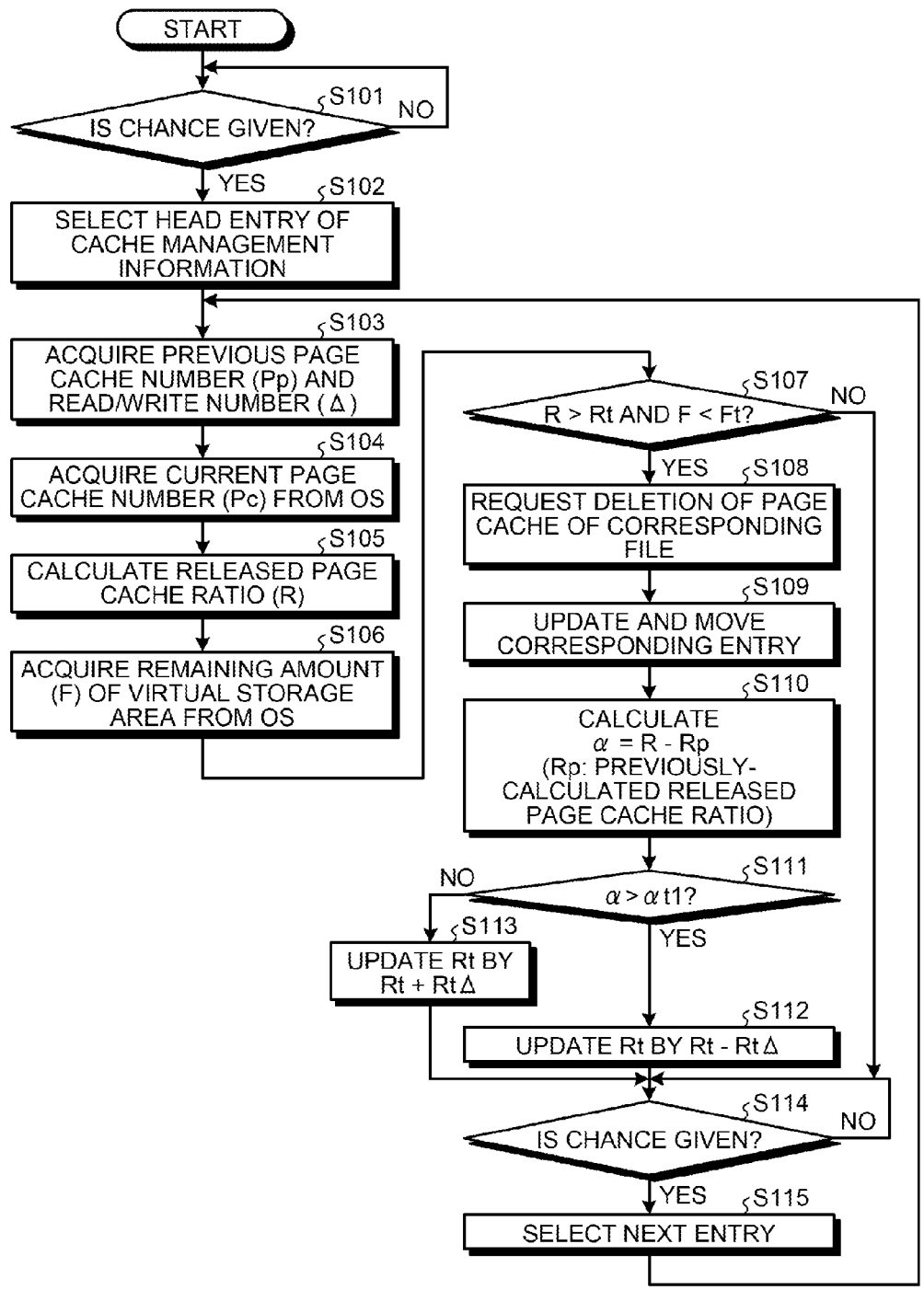
FIG. 6 is a flowchart illustrating a flow of cache management processing performed by a server according to the first embodiment.

Next, a flow of cache management processing performed by the server 10 will be explained. FIG. 6 is a flowchart illustrating a flow of cache management processing performed by the server according to the first embodiment.

As illustrated in FIG. 6, when a chance is given (positive in S101), the calculation unit 17b of the cache management unit 17 selects the head entry of cache management information stored in the page cache area 13b (S102). Here, an example of the chance may be a predetermined interval or the timing delay access occurs, that is, it can be arbitrarily set.

Subsequently, the calculation unit 17b acquires the previous page cache number "Pp" and the page number "Δ" read/written from/into a disk, from the selected entry (S103). Also, the calculation unit 17b acquires the inode number from the selected entry, outputs it to the OS and acquires the total number "Pc" of current page caches having the inode number, from the OS (S104).

After that, the calculation unit 17b calculates the released page cache ratio "R"="1−(Pc/Pp+Δ)" (S105). Also, the selection unit 17c acquires the available capacity "F" of the virtual memory area from the OS (S106).

Next, the selection unit 17c acquires the deletion rate initial value "Rt" and the "virtual storage area threshold Ft" from the definition value area 12b and decides whether a condition "R>Rt and F<Ft" is satisfied (S107).

Subsequently, in a case where the selection unit 17c decides that a condition "R>Rt and F<Ft" is satisfied (positive in S107), the deletion request unit 17d requests the OS to delete the page caches having the inode number acquired from the entry (S108). After that, the generation unit 17a updates the entry and subsequently moves the entry to the tail end of the cache management information (S109).

Subsequently, the threshold update unit 17e acquires the previously-calculated released page cache ratio "Rp" from the memory 13 or the like, and calculates "α=currently-calculated released page cache ratio 'R'-previously-calculated released page cache ratio 'Rp'" (S110).

Subsequently, the threshold update unit 17e acquires the loss acceleration caution value "αt1" from the definition value area 12b and decides whether "α" calculated in S110 is greater than the loss acceleration caution value "αt1" (S111).

After that, in a case where "α" is greater than the loss acceleration caution value "αt1" (positive in S111), the threshold update unit 17e updates the deletion rate initial value "Rt" stored in the definition value area 12b, by the "current deletion rate initial value 'Rt−RtΔ'" (S112). That is, the threshold update unit 17e updates the deletion rate initial value "Rt" to a smaller value. At this time, the threshold update unit 17e sets the deletion rate initial value "Rt" such that the deletion rate initial value "Rt" is not below the loss acceleration safety value "αt2." Here, RtΔ is an arbitrary value.

Meanwhile, in a case where "α" is less than the loss acceleration caution value "αt1" (negative in S111), the threshold update unit 17e updates the deletion rate initial value "Rt" stored in the definition value area 12b, by the "current deletion rate initial value 'Rt+RtΔ'" (S113). That is, the threshold update unit 17e updates the deletion value initial value "Rt" to a larger value.

After that, the cache management unit 17 waits for a predetermined time (S114), and, when the next chance is given (positive in S114), the calculation unit 17b selects the next entry (S115) and performs processing in S103 and subsequent steps. Also, in 5107, even in a case where the selection unit 17c decides that a condition "R>Rt and F<Ft" is not satisfied (negative in S107), the cache management unit 17 performs processing in S114 and subsequent steps.

Specific Example

Next, the specific example of each above processing will be explained. Here, entry update processing of cache management information by page caches and entry update processing of cache management information by reading or writing will be explained.

Update by Page Cache Deletion

Figure 7:
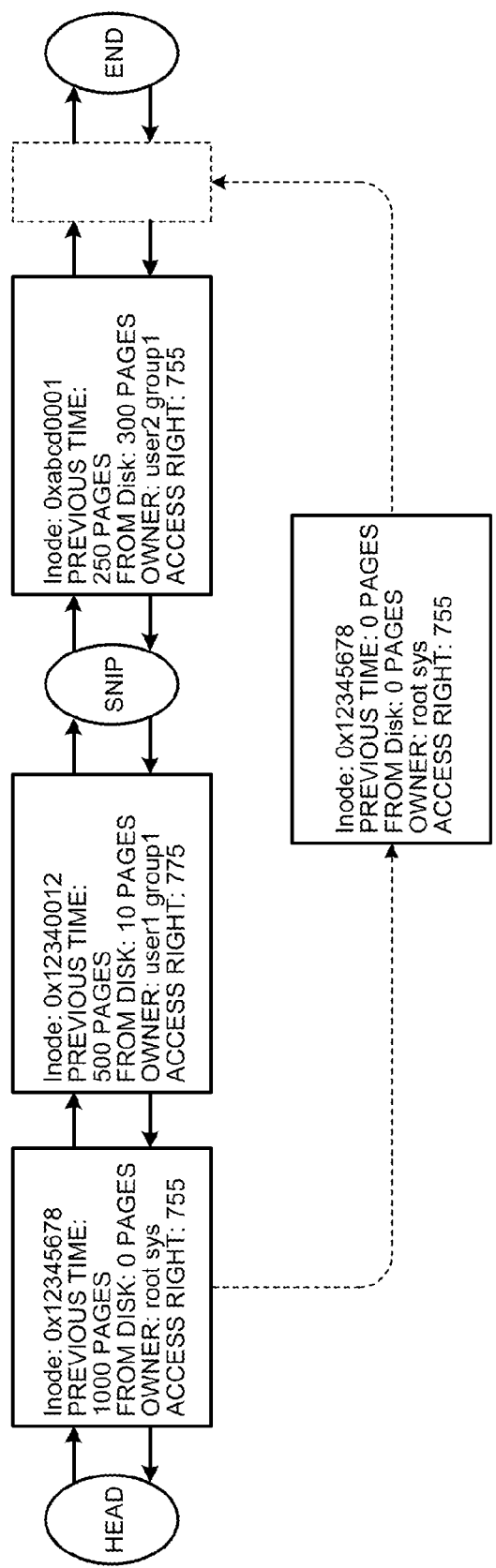
FIG. 7 is a diagram illustrating a specific example of entry update processing by page cache deletion.

FIG. 7 is a diagram illustrating a specific example of entry update processing by page cache deletion. As illustrated in FIG. 7, cache management information is formed with a plurality of link-connected entries in which the head entry is file information having an inode number of "0x12345678."

In such a configuration, when a predetermined chance is given, the calculation unit 17b of the cache management unit 17 acquires the "previous page cache number (PC)" and the "page number "Δ" read/written from/into a disk" from a corresponding entry. Also, the calculation unit 17b acquires the "current page cache number (Pp)" from the OS using the inode number of the corresponding entry. Subsequently, the calculation unit 17b calculates the released page cache ratio "R." After that, the selection unit 17c acquires the available capacity "F" of the virtual storage area from the OS and acquires the previously-calculated released page cache ratio "Rt" from the memory 13 or the like. Also, the selection unit 17c acquires the "virtual storage area threshold F0" from the definition value area 12b.

Subsequently, in a case where a condition "R>Rt and F<F0" is satisfied, the deletion request unit 17d reports an inode number of the corresponding entry to the OS and requests a page cache having the inode number to be deleted. Thus, the OS can delete each page cache having the reported inode number, that is, each data corresponding to the identical file from the page cache area 13b of the memory 13. After that, the generation unit 17a updates the "previous page cache number (Pc)" and the "page "Δ" read/written from/into a disk" of the processed entry to "0" and subsequently moves it to the tail end of the cache management information.

Here, an example will be explained where it is decided whether to delete a page cache of an entry (inode number=0x12345678) positioned in the head. As illustrated in FIG. 7, in the target entry, the "previous page cache number (Pc)=1000" and the "page "Δ" read/written from/into a disk=0" are stored. Also, each definition value is set as illustrated in FIG. 3 and it is assumed that the previously calculated R value "Rp" is 0.02.

First, the calculation unit 17b reports the mode number (0x12345678) of the corresponding entry to the OS and acquires the "current page cache number (Pp)=900" from the OS. Subsequently, the calculation unit 17b calculates the released page cache ratio "R"="1−(Pc/Pp+Δ)," that is, "R=1−(900/(1000+0))=0.1."

Next, the selection unit 17c acquires the available capacity of the virtual storage area "F=80 gigabytes" from the OS. Subsequently, the selection unit 17c decides whether a condition "R>Rt and F<Ft," that is, "0.1>0.02 and 80<100." Subsequently, since the condition is satisfied, the deletion request unit 17d requests the OS to delete a page cache having the "inode number=0x12345678" registered in the entry. Subsequently, the OS deletes each page cache having the "inode number=0x12345678" from the page cache area 13b of the memory 13.

Subsequently, after storing "0" in the "previous page cache number (Pc)" in the entry of the inode number (0x12345678) and storing "0" in the "page (Δ) read/written from/into a disk," the generation unit 17a moves the entry to the tail end of the cache management information.

After that, the threshold update unit 17e calculates "α=R value (0.1)−Rp value (0.02)=0.08," and, since a condition "α=0.08>αt1 (0.05)" is established, a value subtracting "0.01" from the current Rt value is set as the next Rt value. That is, the threshold update unit 17e updates the definition values, using "0.09" subtracting "0.01" from the current Rt value "0.1" as the next deletion rate initial value Rt. Also, at the time of the next calculation, the currently calculated R value (0.1) is treated as the previously calculated Rp value.

Update by Reading or Writing

Figure 8:
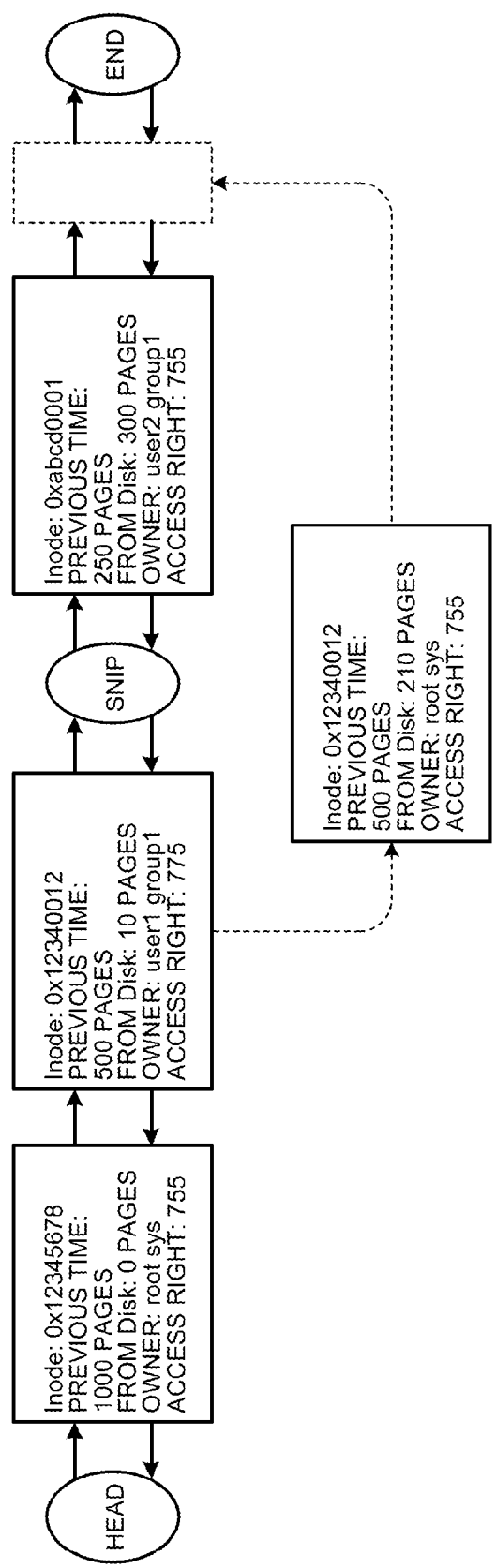
FIG. 8 is a diagram illustrating a specific example of entry update processing by the reading or writing of a file.

FIG. 8 is a diagram illustrating a specific example of entry update processing by the reading or writing of a file. As illustrated in FIG. 8, the cache management information is formed with the plurality of link-connected entries in which the head entry is file information having an inode number of "0x12345678."

In such a configuration, the OS issues a system call for the file reading or writing by performing processing by an application, and stores a corresponding page cache in the page cache area 13b of the memory 13. That is, in a case where the file data referred to by the application is not cached in the memory 13, it is read from the disk 12 and cached. At this time, the generation unit 17a of the cache management unit 17 counts the number of page caches created by the OS.

After that, the OS reads the cache management unit 17 by extension of the system call, and, at this time, transmits to the cache management unit 17 an address of an object designating the corresponding file in the cache management information. The generation unit 17a of the cache management unit 17 adds the total number of counted page caches to the "page number read/written from/into a disk" of the entry of the cache management information indicated by the received address, and moves the entry to the tail end of the cache management information.

Here, an example will be explained in detail where the reading or writing is performed on an entry (inode number=0x12340012) in the second position from the head. An operation by the user "root sys" is performed in the file of "inode number=0x12340012" and page caches corresponding to data in the file are generated by "200 pages." At this time, the generation unit 17a of the cache management unit 17 acquires the user information of "root sys," the generated page cache number "200" and the access right "755" assigned to the user, from the OS, and temporarily holds these.

After that, when receiving the "inode number=0x12340012" from the OS, the generation unit 17a specifies an entry of the cache management information corresponding to the "inode number=0x12340012." Subsequently, as illustrated in FIG. 8, the generation unit 17a adds the temporarily held page cache number "200" to the "page number read/written from/into a disk=10" of the specified entry. Similarly, the generation unit 17a updates the "owner" of the specified entry to "root sys" and updates the "access right" to "755." After that, the generation unit 17a moves the entry corresponding to the "inode number=0x12340012" to the tail end of the cache management information.

Thus, the generation unit 17a updates an entry of the cache management information every time the reading or writing of a file occurs. Also, an updated entry is moved to the tail end of the cache management information. That is, regarding a file that was recently referred to, the priority of page cache deletion becomes low. Therefore, it is possible to prevent a page cache of a file that is frequently referred to, from being deleted.

As described above, in the case of deciding from the page number variation in cache data and a disk access status that a page cache release is frequently performed, the server 10 according to the first embodiment deletes it from a cache. When deleting a page cache, this server 10 integrally processes page caches having the identical inode number as selection targets, and therefore it is possible to implement the deletion in page units and file units. That is, the server 10 according to the first embodiment can integrally delete cached data in the identical file. As a result of this, regardless of a state that a page cache release is frequently performed, it is possible to prevent a state in which only part of a file is cached in the memory 13. Therefore, since it is possible to suppress an occurrence of fragmentation in the memory 13 and suppress the degradation of the application execution speed, it is possible to prevent the degradation of the whole processing performance of the server 10.

[b] Second Embodiment

In the first embodiment, although an example has been descried where the server 10 deletes a page cache alone, it is not limited to this, and it is possible to decide whether to delete a page cache in consideration of cache states of other servers. Therefore, in a second embodiment, an example will be explained where a plurality of servers delete a page cache in cooperation.

Whole Configuration

Figure 9:
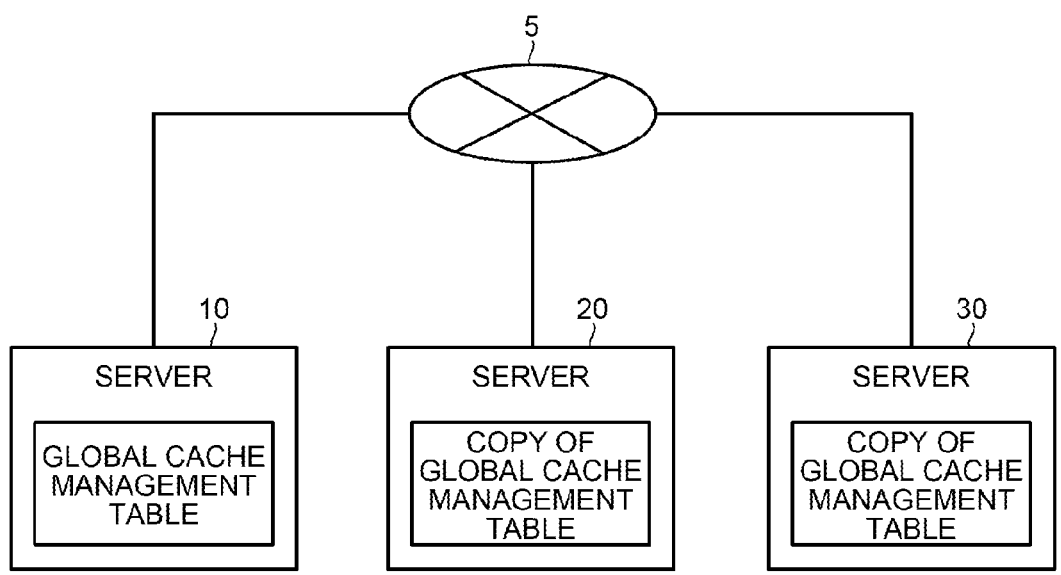
FIG. 9 is a diagram illustrating a whole configuration example of an information processing system according to a second embodiment.

FIG. 9 is a diagram illustrating a whole configuration example of an information processing system according to the second embodiment. As illustrated in FIG. 9, this information processing system has a similar configuration to that of the information processing system illustrated in FIG. 1. It differs from the first embodiment in that one representative server holds a global cache management table and the other servers have a copy of the global cache management table.

The global cache management table is information indicating the file cache state of each server and the remaining amount of the server's virtual storage area. This global cache management table is generated in one representative server and distributed to each server. In FIG. 9, the server 10 generates the global cache management table and distributes its copy to each server. Also, the representative server can be arbitrarily selected.

Before performing the processing explained in the first embodiment, each server refers to the global cache management table. Subsequently, in a case where a deletion target file is cached in many other servers, each server excludes the file from a deletion target. By this means, it is possible to suppress deletion of a file, which is likely to be definition information that is always shared, from a page cache.

Also, in a case where a deletion target file is cached in some other servers (equal to or less than a threshold number defined in advance) and the virtual storage areas of the servers caching it are equal to or less than a threshold, each server can exclude the file from deletion targets. When the virtual storage areas of the servers caching it are equal to or less than the threshold, it means that the OS may cache out it to solve an insufficient memory, and, by excluding such a cache entry from cache-out targets, it is possible to prevent file data from being lost on all server's page caches.

Server Configuration

Figure 10:
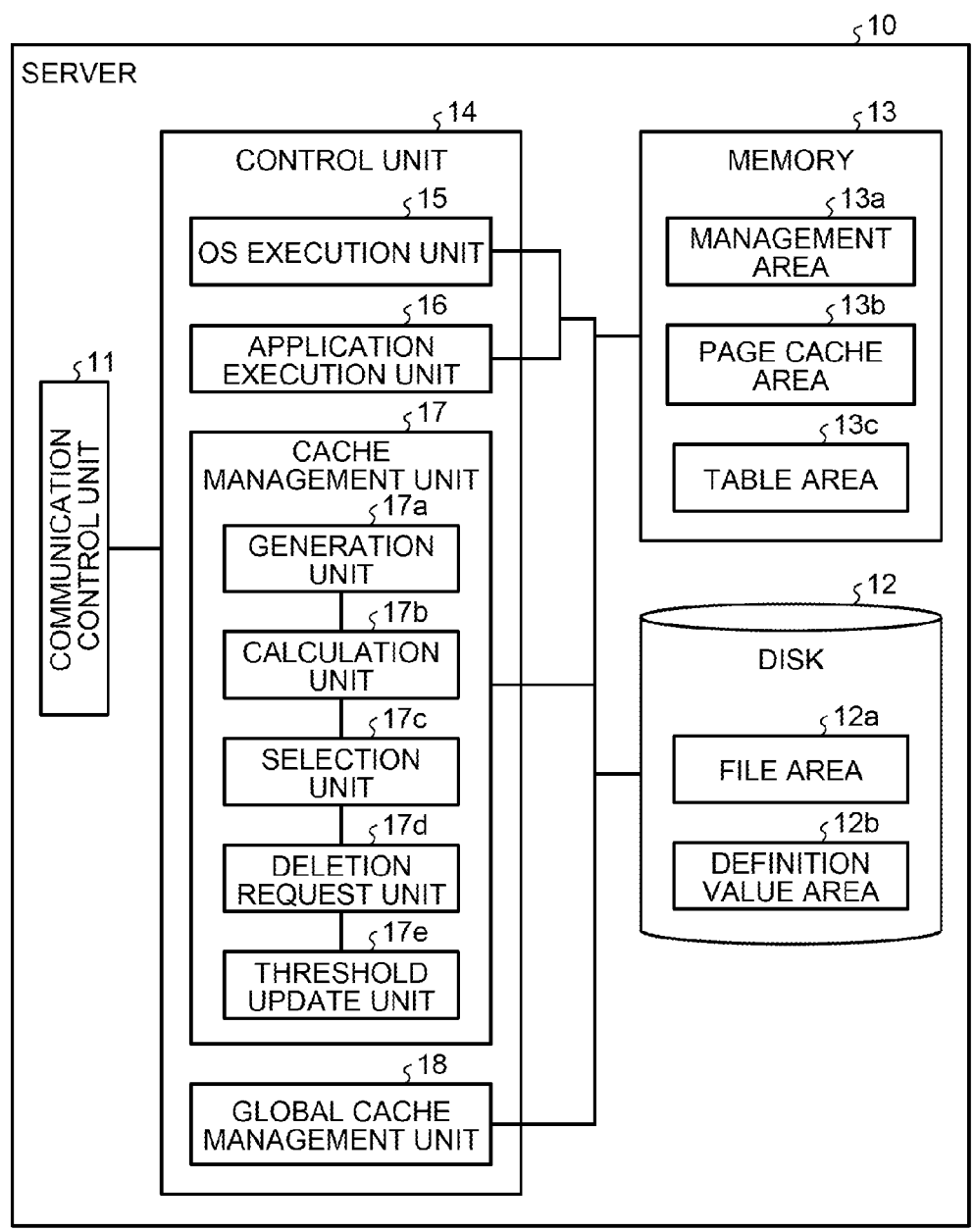
FIG. 10 is a function block diagram illustrating a configuration of a server according to the second embodiment.

FIG. 10 is a function block diagram illustrating a configuration of a server according to the second embodiment. As illustrated in FIG. 10, the server 10 includes the communication control unit 11, the disk 12, the memory 13 and the control unit 14. It differs from the first embodiment in that the table area 13c of the memory 13 holds a global cache management table and the global cache management unit 18 is held. Also, processing in the global cache management unit 18 is different between a representative server and the other servers, and therefore each case will be explained.

Figures 11, 12:
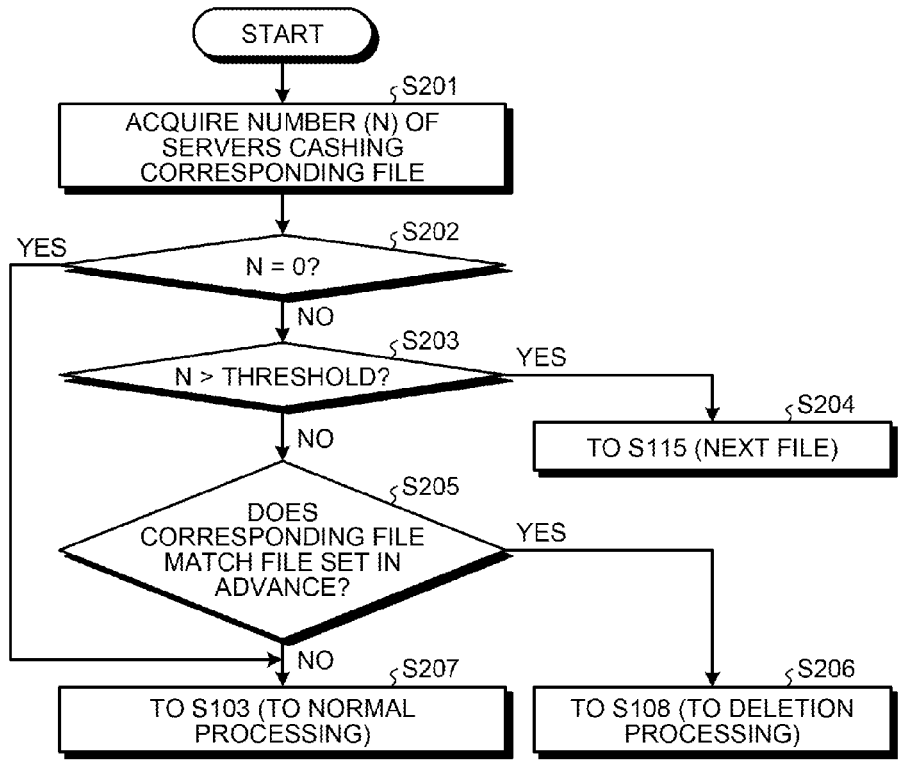
FIG. 11 is a diagram illustrating an example of a global cache management table.
FIG. 12 is a flowchart illustrating a flow of global cache management processing performed by a server according to the second embodiment.

The global cache management table is information indicating which server caches which file, and indicating how available the virtual storage area in the server is. FIG. 11 is a diagram illustrating an example of the global cache management table. As illustrated in FIG. 11, the global cache management table is formed with the "inode, file name, IP (Internet Protocol) address and remaining amount of server's virtual storage area."

This "inode" denotes the inode number to identify a file cached in a memory and the "file name" denotes the file name having data indicated by the inode number. The "IP address" denotes the IP address of a server caching the file. The "remaining amount of server's virtual storage area" denotes the reaming amount of the virtual storage area of the server at the timing of acquiring cached file information from the server. In the case of FIG. 11, the file of an inode number of "0x12345bbb" has a file name of "/data/file1" and is cached in the server of an IP address of "10.10.10.100," and, at the timing this information is acquired, it represents that the remaining amount of the virtual storage area of the server is "900" MB.

Such a global cache management table is information acquired by a predefined entry number from the tail end of the cache management information managed by each server. That is, the global cache management table is information of page caches that are less likely to be deleted from the page cache area 13b of each server.

The global cache management unit 18 is a processing unit to generate a global cache management table, distribute the global cache management table and transmit entry information. Here, the case of a representative node and the case of the other nodes will be explained.

Representative Node

It is assumed that the node 10 is a representative node. In this case, the global cache management unit 18 generates and distributes a global cache management table. To be more specific, when receiving the inode numbers of cached files and the remaining amounts of virtual storage areas from the other nodes, the global cache management unit 18 generates or updates a global cache management table and distributes it to each server.

For example, in the case of receiving an inode number, a file name and the remaining amount of a virtual storage area from the server 20, the global cache management unit 18 generates an entry associated with the IP address of the server 20, the inode number, the file name and the remaining amount of the virtual storage area, and adds or merges it to the global cache management table. At this time, regarding data from the same IP address, the global cache management unit 18 deletes previously-received old information. Subsequently, the global cache management unit 18 distributes a copy of the update global cache management table to each server connected to the server 10. At this time, the global cache management unit 18 may distribute a copy of the whole global cache management table or distribute only a difference from the previous one. By this means, each server can hold a common global cache management table.

General Node

Next, it is assumed that the node 10 is a general node different from a representative node. In this case, the global cache management unit 18 transmits entry information of a global cache management table. To be more specific, the global cache management unit 18 acquires entries by a predefined number from the tail end of cache management information at predetermined intervals, acquires a file name corresponding to the inode number and acquires the available capacity of the virtual storage area at the time of acquisition from the OS. Subsequently, the global cache management unit 18 transmits the acquired information to a representative node. As a response of this transmission, the global cache management unit 18 receives a copy of a global cache management table from the representative server. Subsequently, the global cache management unit 18 updates a global cache management table stored in the table area 13c of the memory 13, by the received copy of the global cache management table.

Flow of Processing

Next, a flow of processing performed by the server 10 according to the second embodiment will be explained. FIG. 12 is a flowchart illustrating a flow of global cache management processing performed by the server according to the second embodiment. The processing illustrated in FIG. 12 is performed between S102 and S103 and between S115 and S103 in FIG. 6.

The calculation unit 17b of the cache management unit 17 acquires a file name corresponding to an inode number included in the head entry selected in S102 and counts the number of the file names stored in the global cache management table (S201). First, it is decided whether the file names are matched, and, in a case where these file names are matched and the remaining amount of a virtual storage area of the server is equal to or greater than a threshold, it is decided that they are stored. The total storage number is set as a number (N) of servers caching the file.

The calculation unit 17b decides whether the acquired server number (N) is 0 (S202). In the case of 0 (positive in S202), the server 10 performs 5103 and subsequent steps in FIG. 6 (S207). In other cases than the case of 0 (negative in S202), the server 10 performs 5203.

Subsequently, the calculation unit 17b decides whether the acquired server number (N) is greater than a threshold (S203). In the case of deciding that the acquired server number (N) is greater than the threshold (positive in S203), the calculation unit 17b performs S115 and subsequent steps in FIG. 6 (S204).

Meanwhile, in the case of deciding that the acquired server number (N) is less than the threshold (negative in S203), the calculation unit 17b decides whether the file of the inode number is a deletion target file set in advance (S205).

Subsequently, in the case of deciding that the file of the inode number is a deletion target file set in advance (positive in S205), the calculation unit 17b performs 5108 and subsequent steps in FIG. 6 (S206). Meanwhile, in the case of deciding that the file of the inode number is not a deletion target file set in advance (negative in S205), the calculation unit 17b performs 5103 and subsequent steps in FIG. 6 (S207).

That is, the calculation unit 17b defines in advance a directory to store data used for distribution processing or the like, decides that it is sufficient for a file in this directory to be cached in one server, and deletes it from a cache in a positive manner.

Thus, each server according to the second embodiment can perform cache-out processing taking into account cache states of other servers in addition to a cache state of the own server. To be more specific, regarding a file commonly held between servers, each server according to the second embodiment can exclude it from deletion targets since there is a high possibility that it is important information. Also, in a case where a cache is stored in a global cache management table and the remaining amount of a virtual storage area of the server is small, by excluding it from deletion targets, even when the cache is forcefully deleted by an OS, each server according to the second embodiment can maintain the cache in the server excluding it from the deletion targets, and it is possible to prevent the file data from being cached out from all servers.

[c] Third Embodiment

Although embodiments of the present invention have been described above, the present invention may be implemented in various different formats in addition to the above embodiments. Therefore, a different embodiment will be explained below.

Disk

For example, the disk 12 explained in FIG. 2 or the like is not limited to a hard disk drive but may be an SSD (Solid State Drive) or a storage device which has a lower speed than a memory and in which cache original data is stored.

Decision of Available Capacity

For example, as a decision criterion to delete a file from a cache, although a case has been described where the remaining amount of a virtual storage area of a server is used, it is not limited to this. For example, in the first embodiment, it may be decided only whether the released page cache ratio "R" is less than the threshold "Rt." Also, in the second embodiment, it is possible to omit the processing in S203 and S204.

Method of Selecting a Deletion File

For example, in the first embodiment, an example has been described where the released page cache ratio "R" is calculated, a deletion target file is specified and a page cache of the file is selected and deleted from a memory, but it is not limited to this. For example, a server determines to delete a page cache that is not recently referred to, without calculating the released page cache ratio "R." Subsequently, the server can integrally select and delete, from a memory, page caches having the same inode number as an inode number of the page cache.

System

Also, in each processing explained in the present embodiment, it is possible to manually perform all or part of the processing explained as one automatically performed. Alternatively, by a well-known method, it is possible to automatically perform all or part of the processing explained as one manually performed. In addition to this, regarding information including the processing procedure, control procedure, specific names and various kinds of data or parameters illustrated in the above description and drawings, it can be arbitrarily changed if not otherwise specified.

Also, each illustrated component of each device is a functional concept and is not always requested to be physically configured as illustrated in the drawings. That is, the specific format of distribution/integration in each device is not limited to what is illustrated in the drawings. That is, depending on various loads or a use status, it is possible to form them by functionally or physically distributing or integrating all or part of them in an arbitrary unit. For example, it is possible to integrate the cache management unit 17 and the global cache management unit 18. Further, part or all of each processing function performed in each device can be realized by a CPU and a program analyzed and executed by the CPU, or can be realized as hardware by wired logic.

Hardware Configuration

Meanwhile, various kinds of processing explained in the above embodiments can be realized by executing a prepared program in a computer system such as a personal computer or workstation. Therefore, in the following, an example of a computer that executes a program having a similar function to that in the above embodiments will be explained.

Figure 13:
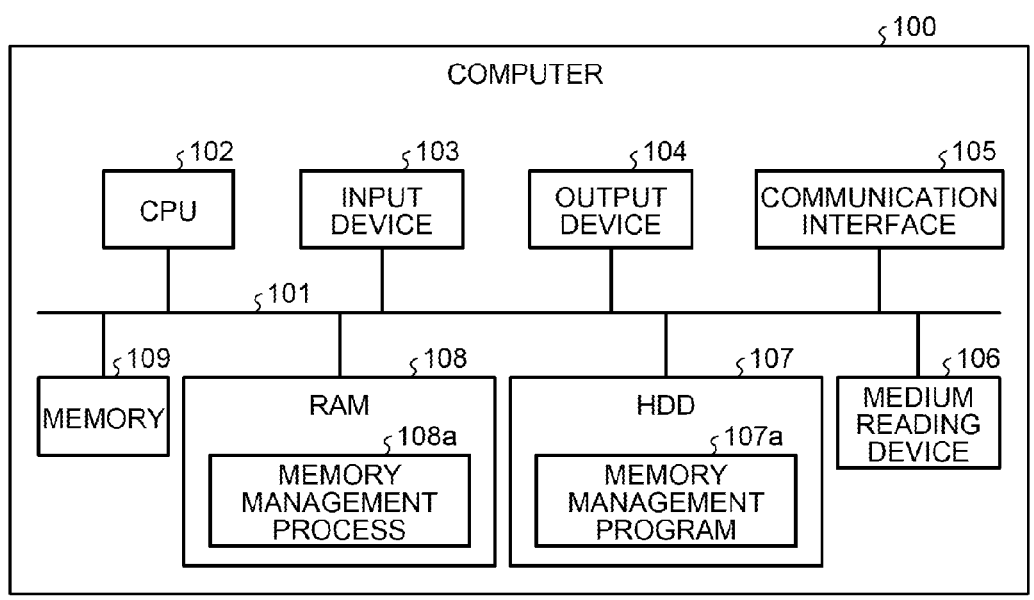
FIG. 13 is a diagram illustrating a hardware configuration example of a computer that executes a memory management program.

FIG. 13 is a diagram illustrating a hardware configuration example of a computer that executes a memory management program. As illustrated in FIG. 13, a computer 100 includes a CPU 102, an input device 103, an output device 104, a communication interface 105, a medium reading device 106, an HDD (Hard Disk Drive) 107, an RAM (Random Access Memory) 108 and a memory 109. Also, these units illustrated in FIG. 13 are connected to each other via a bus 101.

The input device 103 is a mouse, keyboard or the like, the output device 104 is a display or the like, and the communication interface 105 is an interface such as an NIC (Network Interface Card). The HDD 107 stores, for example, each table illustrated in FIG. 2 in addition to a memory management program 107a. Although the HDD 107 is illustrated as an example of a storage medium, it may be possible to store various programs in other computer-readable storage media such as an ROM (Read Only Memory), an RAM and a CD-ROM, and cause a computer to read them. Also, it may be possible to arrange a storage medium in a remote place and acquire and use a program by accessing the storage medium by a computer. Also, at that time, the acquired program may be stored in a storage medium in the computer itself and used.

By reading the memory management program 107a and developing it in the RAM 108, the CPU 102 operates a memory management process 108a to execute each function explained in FIG. 2 or FIG. 10. That is, the memory management process 108a activates the OS execution unit 15, the application execution unit 16, the cache management unit 17 and the global cache management unit 18. Thus, by reading and executing the program, the computer 100 operates as an information processing device that executes a memory management method.

Also, by reading a memory management program from a storage medium by the medium reading device 106 and executing the read memory management program, the computer 100 can realize a similar function to that in the above embodiments. Also, a program referred to in other embodiments is not limited to the one executed by the computer 100. For example, even in a case where a different computer or a server executes a program or these execute a program in cooperation, the present invention is similarly applicable.

It is possible to suppress degradation of processing performance.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory, wherein the processor executes a process comprising:
   caching data read from a storage or data written into the storage, in the memory;
   selecting data included in a same file as deletion target data from the memory when deleting the data cached in the memory from the memory;
   deleting the deletion target data and the data selected at the selecting, from the memory;
   generating page management information to count the number of pages cached in the memory of a file read from the storage or a page cache of the file written into the storage within a predetermined time, in association with an identifier to identify the file including the cached data and a total number of page caches of the file cached in the memory a predetermined time before; and
   calculating a ratio of releasing page caches of the file including the deletion target data from the memory within the predetermined time at predetermined intervals from a head entry of the page management information, wherein the ratio equals "1-(Pc/Pp+Δ)", Pc is a total number of currently-cached page caches, Pp is a previous page cache number, and Δ is a page number read from a disk or written into the disk,
   the selecting includes selecting data included in a same file as the deletion target data from the memory, in a case where the ratio calculated at the calculating is over a threshold, and
   when a page cache release rate is between first loss acceleration and second loss acceleration, it is decided that page cache release speed is a safety value.

2. The information processing device according to claim 1, wherein the selecting includes selecting data included in the same file as the deletion target data from the memory, in a case where the ratio calculated at the calculating is over a threshold and an available capacity of a virtual memory area virtually assigned to a physical area of the memory is smaller than a predetermined value.

3. The information processing device according to claim 1, further comprising updating the threshold to a smaller value in a case where a difference between a ratio calculated at the calculating at the current time and a ratio calculated at the calculating the predetermined time before, is greater than a first reference value, and updating the threshold to a larger value in a case where the difference is less than a second reference value.

4. The information processing device according to claim 1, wherein the generating includes generating the page management information by prioritizing data that is not recently referred to among the data cached in the memory, and
   the calculating includes moving an entry corresponding to the data read from the storage or written into the storage among entries of the page management information, to a tail end of the page management information.

5. The information processing device according to claim 1, further comprising:
   acquiring an identifier to identify a file cached in memories which other information processing devices hold, from each information processing device, and
   deciding whether the deletion target data is cached at the calculating in the memories of the other information processing devices equal to or greater than a predetermined number, using the identifier acquired at the acquiring,
   wherein the selecting includes excluding the file including the deletion target data from a deletion target, in a case where the deletion target data is cached in the memories of the other information processing devices equal to or greater than the predetermined number at the deciding.

6. The information processing device according to claim 5, wherein the acquiring includes acquiring the identifier and a remaining amount of the virtual memory area in the each information processing device, and
   the selecting includes excluding the file including the deletion target data from a deletion target, in a case where the remaining amount of the virtual memory area associated with the deletion target data is equal to or less than a predetermined value.

7. A memory management method comprising:
   caching data read from a storage or data written into the storage, in a memory, using a processor;
   selecting data included in a same file as deletion target data from the memory when deleting the data cached in the memory from the memory, using the processor;
   deleting the deletion target data and the selected data from the memory, using the processor;
   generating page management information to count the number of pages cached in the memory of a file read from the storage or a page cache of the file written into the storage within a predetermined time, in association with an identifier to identify the file including the cached data and a total number of page caches of the file cached in the memory a predetermined time before, using the processor; and
   calculating a ratio of releasing page caches of the file including the deletion target data from the memory within the predetermined time at predetermined intervals from a head entry of the page management information, using the processor, wherein the ratio equals "1-(Pc/Pp+Δ)", Pc is a total number of currently-cached page caches, Pp is a previous page cache number, and Δ is a page number read from a disk or written into the disk,
   the selecting includes selecting data included in a same file as the deletion target data from the memory, in a case where the ratio calculated at the calculating is over a threshold, and when a page cache release rate is between first loss acceleration and second loss acceleration, it is decided that page cache release speed is a safety value.

8. A non-transitory computer-readable recording medium having stored therein a program for causing a computer to execute a memory management process comprising:

caching data read from a storage or data written into the storage, in a memory;

selecting data included in a same file as deletion target data from the memory when deleting the data cached in the memory from the memory;

deleting the deletion target data and the selected data from the memory;

generating page management information to count the number of pages cached in the memory of a file read from the storage or a page cache of the file written into the storage within a predetermined time, in association with an identifier to identify the file including the cached data and a total number of page caches of the file cached in the memory a predetermined time before; and calculating a ratio of releasing page caches of the file including the deletion target data from the memory within the predetermined time at predetermined intervals from a head entry of the page management information, wherein the ratio equals "1-(Pc/Pp+Δ)", Pc is a total number of currently-cached page caches, Pp is a previous page cache number, and Δ is a page number read from a disk or written into the disk, the selecting includes selecting data included in a same file as the deletion target data from the memory, in a case where the ratio calculated at the calculating is over a threshold, and when a page cache release rate is between first loss acceleration and second loss acceleration, it is decided that page cache release speed is a safety value.

* * * * *